United States Patent
Su et al.

(10) Patent No.: US 10,466,716 B1
(45) Date of Patent: *Nov. 5, 2019

(54) VEHICLE COMMAND GENERATION USING VEHICLE-TO-INFRASTRUCTURE COMMUNICATIONS AND DEEP NETWORKS

(71) Applicant: SF Motors, Inc., Santa Clara, CA (US)

(72) Inventors: Ao-Jan Su, Santa Clara, CA (US); Xinhua Xiao, Santa Clara, CA (US)

(73) Assignees: CHONGQING JINKANG NEW ENERGY VEHICLE CO., LTD, Chingqing (CN); SF MOTORS INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/122,561

(22) Filed: Sep. 5, 2018

(51) Int. Cl.
| | |
|---|---|
| H04L 12/24 | (2006.01) |
| G05D 1/02 | (2006.01) |
| H04W 4/44 | (2018.01) |
| G07C 5/00 | (2006.01) |
| G06N 3/08 | (2006.01) |
| G06N 3/04 | (2006.01) |
| G06N 20/00 | (2019.01) |

(52) U.S. Cl.
CPC ......... *G05D 1/0285* (2013.01); *G06N 3/0454* (2013.01); *G06N 3/08* (2013.01); *G06N 20/00* (2019.01); *G07C 5/008* (2013.01); *H04W 4/44* (2018.02); *G05D 2201/0213* (2013.01)

(58) Field of Classification Search
CPC .............................. G05D 1/0285; H04W 4/44
See application file for complete search history.

(56) References Cited

U.S. PATENT DOCUMENTS 8,462,821 B1 * 6/2013 Sagarwala ............ H04J 3/0667
370/503
9,147,353 B1 9/2015 Slusar
(Continued)

OTHER PUBLICATIONS

Dong et al."Characterizing Driving Styles with Deep Learning", CoRR abs/1607.03611, 2016.
(Continued)

*Primary Examiner* — Jess Whittington
(74) *Attorney, Agent, or Firm* — Foley & Lardner LLP; James De Vellis

(57) ABSTRACT

Commanding vehicles via a vehicle-to-infrastructure communication network are provided. A roadside unit in a location on a vehicular travel path broadcasts timestamps. A vehicle having an onboard unit receives the timestamp, calibrates an internal clock, and transmits a status of the first vehicle to the first roadside computing unit. The roadside unit receives the status of the vehicle, and transmits, to a data processing system, data packets including the status and information associated with the location in the vehicular travel path. The data processing system inputs the status information and the information associated with the location into a deep learning engine to assign, based on an output from the deep learning engine, a label to the vehicle. The data processing system selects a vehicle command based on the label and transmits the vehicle command to the vehicle to execute an action for traversing the vehicular travel path.

20 Claims, 5 Drawing Sheets

(56) References Cited

U.S. PATENT DOCUMENTS

2016/0379486 A1* 12/2016 Taylor .................. G08G 1/0141
340/905
2018/0057001 A1* 3/2018 Hu ...................... B60R 16/0236
2018/0275678 A1* 9/2018 Andert ................. G05D 1/0276

OTHER PUBLICATIONS

Non-Final Office Action on U.S. Appl. No. 16/232,978 dated Mar. 4, 2019.
Olabiyi et al. "Driver Action Prediction Using Deep(Bidirectional) Recurrent Neural Network", ITSC'17 arXiv:1706.02257.

* cited by examiner

VEHICLE COMMAND GENERATION USING VEHICLE-TO-INFRASTRUCTURE COMMUNICATIONS AND DEEP NETWORKS

BACKGROUND

Vehicles such as automobiles can include mechanisms to gather information related to vehicle operation or to the environment of the vehicle. This information can be used for autonomous driving or assisted driving.

SUMMARY

The present disclosure is directed to systems and methods of generating vehicle commands using vehicle-to-infrastructure communications and deep networks. It can be challenging to determine interactions between a vehicle and its environment or between other vehicles driving on a road due to various types of environmental information or road information to be taken into consideration, as well as the changing nature of such information. Without such information, a system may be unable to accurately or reliably determine a vehicle characteristic or interactions between vehicles, thereby resulting in erroneous or inefficient generation of commands for the vehicles.

Systems and methods of the present technical solution provide for vehicle command generation using vehicle-to-infrastructure communications and deep learning networks. The present technology provides a data processing system that can receive status information about a vehicle from a roadside computing device along with current, up-to-date information about the road or current conditions associated with the road. For example, the roadside computing device can receive the status information about the vehicle as the vehicle comes within range of the roadside computing device. The roadside computing device, responsive to receiving the status information, can forward the status information along with current roadside conditions (e.g., road geometry, traffic light signal, weather, or ambient light level) to the data processing system. The roadside computing device can receive status information for one or more vehicles that come within range of the roadside computing device within a predetermined time window. The data processing system can input the status information of the one or more vehicles and the road information into a neural network having an input layer, multiple hidden layers, and an output layer. The data processing system can use the output to label a driving style or characteristic of the one or more vehicles, as well as generate commands to cause the one or more vehicles to perform an action. Actions can include, for example, increasing or reducing a speed of the vehicle, generating an alert or prompt, or pulling the vehicle over. The data processing system can also transmit a command or indication to a third-party entity to process the command or indication for the vehicle.

At least one aspect is directed to a system to command vehicles via a vehicle-to-infrastructure communication network. The system can include a first roadside computing unit positioned at a first location in a vehicular travel path. The first roadside computing unit can broadcast one or more data packets comprising a timestamp. The system can include a first vehicle having an onboard computing unit. The onboard computing unit can receive the one or more data packets broadcast by the first roadside computing unit. The onboard computing unit can calibrate an internal clock based on the timestamp received via the one or more data packets broadcast by the first roadside computing unit. The onboard computing unit can transmit, responsive to receipt of the one or more data packets, a status of the first vehicle to the first roadside computing unit. The first roadside computing unit can receive the status of the first vehicle transmitted by the first vehicle. The first roadside computing unit can generate a second one or more data packets comprising the status of the first vehicle, and information associated with the first location in the vehicular travel path. The first roadside computing unit can transmit the second one or more data packets to a data processing system. The system can include a data processing system having one or more processors and memory, a command generator component and a deep learning engine. The data processing system can input the status information of the first vehicle and the information associated with the first location into the deep learning engine. The data processing system can assign, based on an output from the deep learning engine, a label to the first vehicle. The data processing system can select a vehicle command based on the label. The data processing system can transmit the vehicle command to the first vehicle to execute an action for traversing the vehicular travel path.

At least one aspect is directed to a method of commanding vehicles via a vehicle-to-infrastructure communication network. The method can be performed by a first roadside computing unit, an onboard computing unit of a first vehicle, and a data processing system. The first roadside computing unit can be positioned at a first location in a vehicular travel path. The method can include the first roadside computing unit broadcasting one or more data packets having a timestamp. The method can include the onboard computing unit receiving the one or more data packets broadcast by the first roadside computing unit. The method can include the onboard computing unit calibrating an internal clock based on the timestamp received via the one or more data packets broadcast by the first roadside computing unit. The method can include the onboard computing unit transmitting, responsive to receipt of the one or more data packets, a status of the first vehicle to the first roadside computing unit. The method can include the first roadside computing unit receiving the status of the first vehicle transmitted by the first vehicle. The method can include the first roadside computing unit generating a second one or more data packets including the status of the first vehicle and information associated with the first location in the vehicular travel path. The method can include the first roadside computing unit transmitting the second one or more data packets to a data processing system. The method can include the data processing system inputting the status information of the first vehicle and the information associated with the first location into the deep learning engine. The method can include the data processing system assigning, based on an output from the deep learning engine, a label to the first vehicle. The method can include the data processing system selecting a vehicle command based on the label. The method can include the data processing system transmitting the vehicle command to the first vehicle to execute an action for traversing the vehicular travel path.

At least one aspect is directed to a system to command vehicles via a vehicle-to-infrastructure communication network. The system can include a data processing system having one or more processors and memory. The data processing system can include a command generator component and a deep learning engine. The data processing system can receive, from a roadside computing unit positioned at a vehicular travel path, one or more data packets including status information for a vehicle, a time stamp, and information associated with a location of the vehicle in the vehicular travel path. The data processing system can input the status information of the vehicle and the information associated with the location into the deep learning engine. The data processing system can assign, based on an output from the deep learning engine, a label to the vehicle. The data processing system can select a vehicle command based on the label. The data processing system can transmit the vehicle command to the first vehicle to execute an action for traversing the vehicular path.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
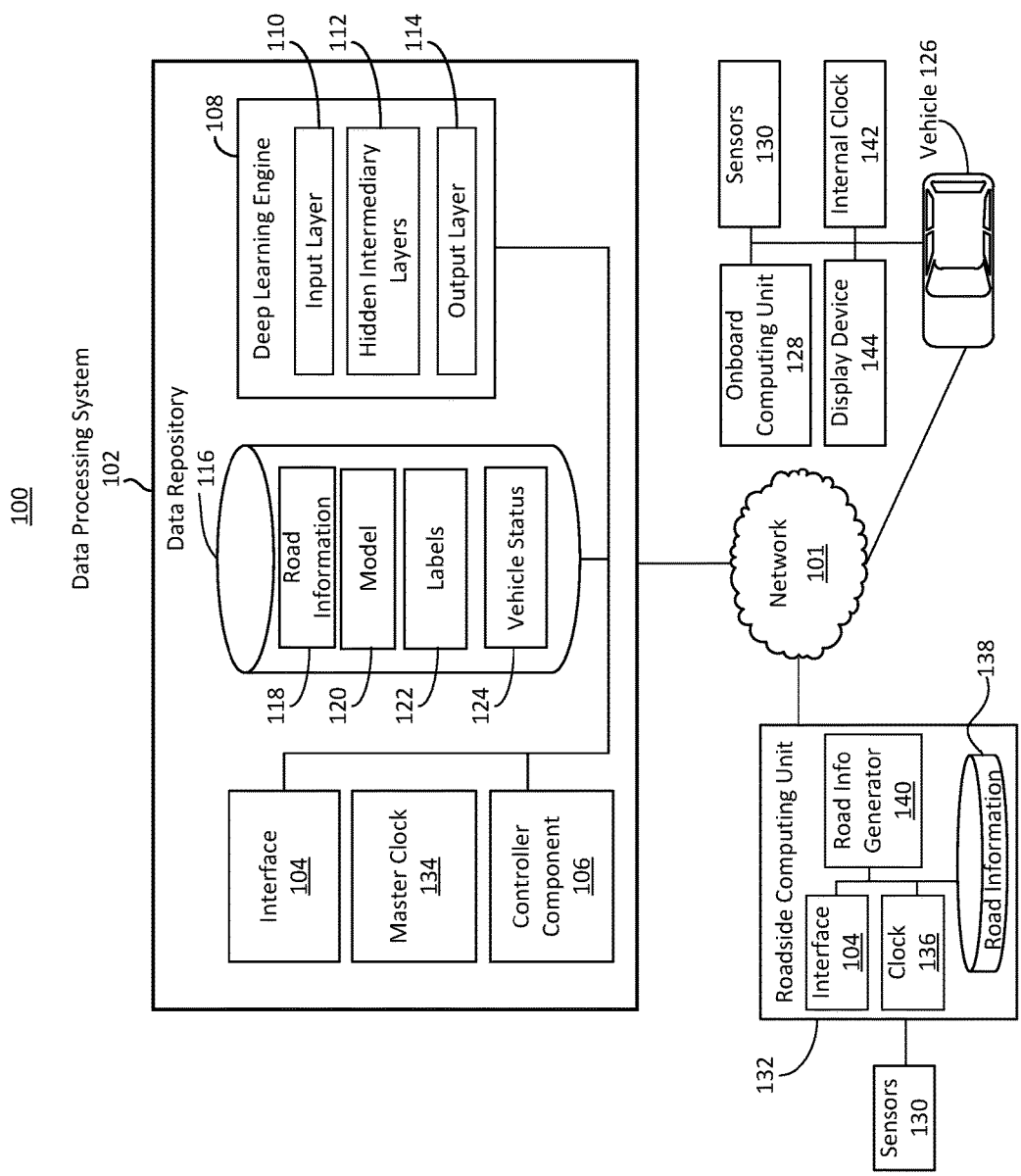
FIG. 1 depicts a block diagram depicting an example system to command vehicles via a vehicle-to-infrastructure communication network, in accordance with an implementation.

Following below are more detailed descriptions of various concepts related to, and implementations of, methods, apparatuses, and systems of commanding vehicles via a vehicle-to-infrastructure communication network. The various concepts introduced above and discussed in greater detail below may be implemented in any of numerous ways.

To accurately, reliably, and efficiently generate commands to cause vehicles to execute actions, a cloud-based system can determine a characteristic of a vehicle as well as one or more nearby vehicles. For example, a data processing can determine a driving style as a factor used to generate a command based on a risk of a driver having traffic accidents. Driving style information can be used to generate commands or instructions for the vehicle or nearby vehicle, as well as by third-parties to monitor vehicles, such as automobile insurance companies or ride service or ride sharing companies that utilize fleets of vehicles. However, measuring driving style can be challenging due to the limited signals available or stale signals. For example, some drivers may aggressively tailgate other vehicles, while some drivers may tend to change lanes abruptly, while others may use their cell phones or be otherwise distracted, thereby preventing them from reacting to traffic conditions promptly.

The disclosed solutions have a technical advantage relative to at least systems that use global positioning systems ("GPS") records, vehicle sensors to learn the behavior of a driver, or vehicle-to-vehicle ("V2V") communications between nearby cars because these systems lack information about road infrastructure or current road conditions, and are not configured to process such information to accurately, reliably and efficiently determine driving style in a real-time manner or near real-time manner (e.g., within 1 second, 2 seconds, 3 seconds or responsive to receiving such information). Thus, systems and methods of the present technical solution can provide a technical advantage relative to systems that use only GPS records, vehicle sensors, or V2V communications by using a vehicle data collection infrastructure suing vehicle-to-infrastructure ("V2I") communication protocol and a deep learning network that can learn multiple driving styles using vehicle data collected and road information provided by the V2I infrastructure.

For example, the vehicle data collection infrastructure can include road infrastructure such as roadside computing units ("RSU") that are deployed at locations to cover areas that vehicles can travel. Each RSU can periodically (e.g., every 1 millisecond, 10 milliseconds, 50 milliseconds, 100 milliseconds, 500 milliseconds, 1 second, 2 seconds, 3 seconds, 5 seconds, 10 seconds or other time frame) broadcast timestamp messages via a V2I communication protocol. V2I communication protocol can include, for example, dedicated short range communications ("DSRC"). A vehicle, upon detecting or receiving the broadcast, can determine vehicle status information and transmit the vehicle status information to the RSU. The RSU, upon receiving the vehicle status information, can forward the vehicle status information, together with road information complied or determined by the RSU, to a data processing system having a deep learning engine. The data processing system can process the vehicle status information and the road information using the deep learning engine in order to determine a label to assign to the vehicle, such as a driving style or other indicator. The data processing system can generate a vehicle command based on the assigned label. The data processing system can forward the vehicle command to the vehicle or other nearby vehicles.

The disclosed system and methods can be incorporated into self-driving advanced driving assistance systems in vehicles such gas powered vehicles, hybrid vehicles, electric vehicles (EVs) or autonomous driving vehicles. Vehicles can include automobiles, cars, motorcycles, scooters, passenger vehicles, passenger or commercial trucks, and other vehicles such as sea or air transport vehicles, planes, helicopters, submarines, boats, or drones. Vehicles can be fully autonomous, partially autonomous, or unmanned. Fully autonomous, partially autonomous or unmanned vehicles can include non-electric vehicles such as vehicles based on combustion engines or non-electric engines.

FIG. 1 depicts a block diagram depicting an example system to command vehicles via a vehicle-to-infrastructure communication network. The system 100 can include at least one data processing system 102 for use in assigning a driving label or generating vehicle commands. The data processing system 102 can include at least one interface 104, at least one master clock 134, at least one controller component 106, at least one deep learning engine 108, and at least one data repository 116. The data processing system 102 can include hardware or a combination of hardware and software, such as communications buses, circuitry, processors, communications interfaces, among others. The data processing system 102 can reside on or within a corresponding vehicle (e.g., a host vehicle).

The deep learning engine 108 can include or access a neural network, such as a convolution neural network formed of or including an input layer 110, one or more hidden intermediary layers 112, and an output layer 114. The data repository 116 can store, manage or reference information to facilitate vehicle command generation including, for example, road information 118, model 120, labels 122, and vehicle status 124. The data repository 116 can include one or more data structure, databases or data files to store the information. The road information 118 can include, for example, road geometry, speed limit for the road, traffic signs on the road, or other regulations associated with the road. The road can refer to or include a vehicular travel path, such as a highway, street, causeway or other lane or path on which vehicles can travel or move. The road information 118 data structure can include road information received by roadside computing units 132 via network 101.

The data repository 116 can include or store one or more models 120. A model 120 can refer to a machine learning model, predictive model, statistical model, trained neural network model. The model 120 can refer to any model generated based on at least some historical information that can be used by the data processing system 102 to facilitate generating commands for a vehicle.

The model data structure 120 can include or store historical data, or training sets used to train or tune neural networks. Tuning a neural network can refer to or include a process of machine learning in which training data sets including historical data are provided to the neural network (e.g., deep learning engine 108) for processing. Tuning can refer to or include training or processing of the neural network (e.g., deep learning engine 108) to allow the neural network to improve accuracy. Tuning the neural network can include, for example, designing the neural network using architectures to solve the type of problem or objective desired for the neural network (e.g., neural network 300 depicted in FIG. 3). In some cases, the one or more neural networks may initiate at a same or similar baseline model, but during the tuning (or training or learning process), the result neural networks can be sufficiently different such that each neural network can be tuned to process a specific type of input and generate a specific type of output with a higher level of accuracy and reliability as compared to a different neural network that is either at the baseline model or tuned or trained for a different objective or purpose. Tuning the neural network can include setting different parameters for each network, fine-tuning parameters differently for each neural network, or assigning different weights (e.g., hyperparameters, or learning rates), tensor flows. Thus, by setting different parameters for each the neural networks based on a tuning or training process and the objective of the neural network, the data processing system can improve performance of the overall path generation process.

The data repository 116 can include or store one or more labels 122. Labels can refer to or include tags, identifiers, signals, category, classification or other indicator that can convey information to facilitate generating vehicle commands or allow a third-party entity to perform an action. For example, a label can include a driving style, such as a tailgater, speeder, lane shifter, aggressive driver, fair-weather driver, or slow driver. A tailgater can refer to a driver that follows closely behind a vehicle. Following closely behind a vehicle can refer to following within a threshold distance. The threshold distance can be an absolute distance measure, based on another dimension, or based on a speed of the vehicle or a speed limit on the road. For example, the threshold distance can be 10 feet, 15 feet, 20 feet, 30 feet, 40 feet, 50 feet, 75 feet, 100 feet, 150 feet, 200 feet, 300 feet or some other distance. The threshold distance can vary based on the type of road, amount of traffic on the road, speed limit on the road, weather conditions, or other factors. The threshold distance can be based on a time-based rule, such as a two-second rule or three-second rule, which indicates that a vehicle is to maintain a distance behind a vehicle that corresponds to the distance traveled by the vehicle in the set amount of time. For example, if the vehicle is traveling at 55 miles per hour, then the threshold distance for a two-second rule can be 160 feet. Thus, if the target vehicle is less than 160 feet (or some percentage of 160 feet, such as 90%, 80%, or 70%), then the data processing system 102 can determine that the driver of the vehicle is a tailgater. A speeder can refer to a driver that exceeds the speed limit set by a governmental or other entity for the road or location on the road. For example, a driver can be labeled a speeder if they exceed the predetermined speed limit by more than 1%, 2%, 3%, or 5 miles per hour, 10 miles per hour or other threshold speed greater than the speed limit. The data processing system 102 can label someone a speeder if they exceed the predetermined speed by the threshold speed for a threshold amount of time (e.g., greater than 30% of driving time per time interval or 30% of driving time on certain categories of roads such as high ways).

The data repository 116 can include or store vehicle status information 124 (e.g., in a vehicle status data structure). Vehicle status information 124 can include, for example, a location of the vehicle, speed of the vehicle, acceleration, turn angle, throttle, brake, or other sensor information. Sensor information can include information about available sensors, identifying information for the sensors, address information, internet protocol information, unique identifiers, data format, protocol used to communicate with the sensors, or a mapping of information type to sensor type or identifier. The vehicle status information 124 can further include or store information collected by sensors 130. The vehicle status information 124 can store sensor data using timestamps and date stamps. The vehicle status data structure can store sensor data using location stamps.

Each of the components of the data processing system 102 can be implemented using hardware or a combination of software and hardware. Each component of the data processing system 102 can include logical circuitry (e.g., a central processing unit or CPU) that responses to and processes instructions fetched from a memory unit (e.g., memory 515 or storage device 525). Each component of the data processing system 102 can include or use a microprocessor or a multi-core processor. A multi-core processor can include two or more processing units on a single computing component. Each component of the data processing system 102 can be based on any of these processors, or any other processor capable of operating as described herein. Each processor can utilize instruction level parallelism, thread level parallelism, different levels of cache, etc. For example, the data processing system 102 can include at least one logic device such as a computing device or server having at least one processor to communicate via the network 101. A data processing system 102 of the vehicle 126 can communicate with a different data processing system 102 that is associated with or part of a second vehicle 102.

The components and elements of the data processing system 102 can be separate components, a single component, or part of the data processing system 102. For example, the interface 104, controller component 106, or deep learning engine 108 (and the other elements of the data processing system 102) can include combinations of hardware and software, such as one or more processors configured to initiate stop commands, initiate motion commands, and transmit or receive timing data, for example.

One or more component of the data processing system 102 can be hosted on or within a vehicle 126. One or more components of the data processing system 102 can reside outside or remote from the vehicle 126, and be in communication with the vehicle for at least a certain time period. For example, portions of data illustrated on the data repository 122 can reside on a remote server, such as in a cloud of servers, that maintains the historical data 134, and can be accessed by the data processing system 102 (e.g., through network 101) at times when the historical data 134 is obtained to generate a path or train a neural network. The components of the data processing system 102 can be connected or communicatively coupled to one another. The connection between the various components of the data processing system 102 can be wired or wireless, or any combination thereof. Counterpart systems or components can be hosted on other vehicles to enable communication or coordination between vehicles.

The network 101 can include computer networks such as the internet, local, wide, near field communication, metro or other area networks, as well as satellite networks or other computer networks such as voice or data mobile phone communications networks, and combinations thereof. The network 101 can include or constitute an inter-vehicle communications network, e.g., a subset of components including the data processing system 102 and components thereof for inter-vehicle data transfer. The network 101 can include a point-to-point network, broadcast network, telecommunications network, asynchronous transfer mode network, synchronous optical network, or a synchronous digital hierarchy network, for example. The network 101 can include at least one wireless link such as an infrared channel or satellite band. The topology of the network 101 can include a bus, star, or ring network topology. The network 101 can include mobile telephone or data networks using any protocol or protocols to communicate among vehicles or other devices, including advanced mobile protocols, time or code division multiple access protocols, global system for mobile communication protocols, general packet radio services protocols, or universal mobile telecommunication system protocols, and the same types of data can be transmitted via different protocols.

The system 100 can include, access, communicate with or otherwise interface with one or more roadside computing units 132. A roadside computing unit 132 can refer to or include a computing device, digital component, digital circuitry, electronic equipment, or sensors. The roadside computing unit 132 can include hardware, software and firmware. Roadside computing unit 132 can be a part of or form a vehicle-to-infrastructure system. The roadside computing unit 132 can include an interface 104. The interface 104 of the roadside computing unit 104 can include one or more component or functionality of the interface 104 of the data processing system 102. The interface 104 can include a wireless communication interface to communicate via a network 101 with a vehicle 126 or data processing system 102. The interface 104 of the roadside computing unit 132 can include a network interface, communication ports, or other hardware and software to wirelessly exchange data with a vehicle 126. The roadside computing unit 132, via interface 104, can perform a wireless and bi-directional exchange of data.

The interface 104 can be configured to use one or more protocols to communicate with the data processing system 102 or vehicles 126. For example, the interface 104 can use a DSRC protocol to communicate with the vehicle 126. DSRC can refer to a protocol for wireless communication. The DSRC protocol can provide for secure, high-speed wireless communication between vehicles and infrastructure. The DSRC protocol can be a one-way or two-way short range to medium-range wireless communication. For example, the DSRC protocol can use a 75 megahertz ("MHz") spectrum in the 5.9 gigahertz ("GHz") band, or 30 MHz spectrum in a 5.9 GHz band, or infrared. The interface 104 can use a different type of communication protocol to communicate with the data processing system 102, such as a cellular based communication (e.g., 3G, 4G, 5G, LTE, etc.) or WiMAX (e.g., worldwide interoperability for microwave access).

The roadside computing unit 132 can include a clock 136. The roadside computing unit 132 can use the clock 136 to generate timestamps to transmit or broadcast to vehicles 126 that are within broadcast range of the roadside computing unit 132. The clock 136 of the roadside computing unit can be intermediate to the master clock 134 of the data processing system 102 and the internal clock 142 of the vehicle 126. For example, the clock 136 of the roadside computing unit 132 can be calibrated, synchronized or syntonized with the master clock 134 of the data processing system 102. In turn, the clock 136 can transmit timestamps or other timing information to the vehicle 126 which the vehicle 126 can use to calibrate the internal clock 142 of the vehicle 126. The clock 136 can include a voltage controlled oscillator clock, a phase-locked loop based clock, quartz clock, or other type of clock or timing module.

Roadside computing units 132 can include or be integrated with lane markings, fences, road barriers, road signs, street lights, traffic lights or other component or portion associated with a vehicular travel path. The roadside computing unit 132 can include memory or storage component 138 to store road information in a data file, database, or data structure. The road information stored in storage component 138 can include information associated with the road infrastructure with which the roadside computing 132 is associated or linked. The road information can be predetermined or preconfigured on roadside computing unit 132. Road information can 138 can include, for example, road geometry, speed limit, traffic sign, or other road regulations. The data processing system 102 can provide or update road information stored in road side compute unit 132. For example, the police department can deploy a mobile speed limit sign dynamically to change the speed limit on a road, and the data processing system 102 can receive this information from a computing device of the police department or other external source, and forward the information to the corresponding roadside computing unit 132 based on location information or other identifying information.

The roadside computing 132 can dynamically determine the road information. For example, the roadside computing unit 132 can include a road information ("info") generator 140 that is designed, constructed or operational to determine, detect or otherwise obtain road information. The road info generator 140 can include or interface with sensors 130 that can communicate or interface with the roadside computing unit 132 via interface 104. The road info generator 140 can determine a current traffic signal, such as a current color of a traffic light, crosswalk signal, railroad crossing, speed limit that may change based on a policy or time of day (e.g., school hours in a school zone, construction, or weather conditions). Thus, the road info generator 140 can detect or otherwise determine current or updated road information in addition to, or instead of, preconfigured or static road information.

The roadside computing unit 132 can periodically broadcast a timestamp generated using the clock 136. The roadside computing 132 can broadcast the timestamp at a predetermined time interval or frequency, such as 1 Hz, 10 Hz, 100 Hz, 200 Hz, 300 Hz, or some other rate or frequency. The roadside computing 132 can use a DSRC protocol or other short or medium range wireless protocol to broadcast the timestamp.

The system 100 can include or interface with one or more vehicles 126. The vehicle 126 can refer to any type of vehicle or automobile such as cars, trucks, vans, sports utility vehicles, motorcycles, self-driving vehicle, or driver assist vehicle. The vehicle 126 can include an onboard computing unit 128. The onboard computing unit 128 can include one or more of hardware, software or firmware. The onboard computing unit 128 can include digital components or circuitry, including, for example, one or more component depicted in FIG. 5.

The onboard computing unit 128 can include or interface with, for example, an electronic control unit ("ECU") of the vehicle 126 to provide drive-by-wire functionality. The onboard computing unit 128 can include or be referred to as an automotive computer, and can include a processor or microcontroller, memory, embedded software, inputs/outputs and communication link(s). An ECU involves hardware and software to perform the functions expected from that particular module. For example, types of ECU include Electronic/engine Control Module (ECM), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), control unit, or control module. Other examples include domain control unit (DCU), Electric Power Steering Control Unit (PSCU), Human-machine interface (HMI), Telematic control unit (TCU), Speed control unit (SCU), Battery management system (BMS). For example, the onboard computing unit 128 of the vehicle 126 can query one or more component or module of vehicle 126 to determine a status of the vehicle 126, which can include, for example, a location or GPS position of the vehicle, speed of the vehicle, acceleration of the vehicle, turn angle of the vehicle, orientation of the vehicle, throttle of the vehicle, brake status or brake amount, or other information.

The vehicle 126 can include an internal clock 142. The internal clock 142 can be a part of or separate from the onboard computing 128. The internal clock 142 can include, for example, a quartz based clock, a voltage controlled oscillator based clock, a phase lock looped based clock, or other type of clock or timing module. However, since the internal clock 142 of the vehicle may be less accurate or precise or lose precision or accuracy over time relative to the master clock 134 of the data processing system 102, the vehicle 126 can calibrate the internal clock 142.

The internal clock 142 can be calibrated based on timing signals. The timing signals can be received by the vehicle 126 from an external source, such as a roadside computing unit 132, satellite, remote transmitter, or data processing system 102. For example, the roadside computing unit 132, via clock 136 and interface 104, can broadcast timestamps. The vehicle 126 can receive the timestamp broadcasted by the roadside computing unit 132. The vehicle 126, responsive to receiving the broadcasted timestamp, can calibrate the internal clock 142. Calibrating the internal clock 142 can refer to or include synchronizing or syntonizing the internal clock 142 with the one or more timestamps received by the roadside computing unit 132. Synchronizing the clock can refer to or include coordinating the internal clock 142 with the clock 136 to improve the accuracy based on adjusting a clock drift resulting from the internal clock 142 counting time at a different rate relative to the clock 136 or clock data processing system 102. For example, if the current time indicated by clock 136 of the roadside computing unit 132 is 5:00:00 PM and the current time indicated by the internal clock 142 of the vehicle 126 is 5:00:30 PM, then the vehicle 126 can set the internal clock 142 to match the clock 136. The vehicle 126 can syntonize the internal clock 142 with the clock 136 of the roadside computing unit 132 by matching the frequency of the clock 140 with the clock 136. For example, the internal clock 142 may count at a different rate relative to the clock 136; thus, the vehicle can calibrate the internal clock 142 to count at the same rate as the clock 136. To syntonize the internal clock 142, the vehicle 126 can tune or adjust a voltage controlled oscillator or use software to adjust the number of pulses per second that can indicate 1 second time.

The vehicle 126 can include or interface with one or more sensors 130. The sensors 130 can be coupled to or associated with a vehicle 126. The sensors 130 can provide information to the data processing system 102. The sensors 130 can be part of the vehicle 126, or remote from the vehicle 126. Sensors 130 can include, for example, a radar sensor, lidar sensor, or camera. Sensors 130 of the vehicle 126 can include accelerometers, gyroscopes, weight sensors, or proximity sensors, that can collect, detect or determine vehicle dynamics information such as orientation data, velocity, or weight.

Sensors 130 can include one or more sensing elements or transducers that capture, acquires, records or converts information about its host vehicle 126 or the host vehicle's 126 environment into a form for processing. The sensor 130 can acquire one or more images or recordings (e.g., photographic, radar, ultrasonic, millimeter wave, infra-red, ultraviolet, light detection and ranging or lidar, or audio, or video). The sensor 130 can communicate sensed data, images or recording to the roadside computing unit 132 for forwarding to the data processing system 102 for processing.

The sensor 130 can include a camera as well as one or more sensors of one or more types. For example, the sensor 130 can include a Radar, light detection and ranging (LIDAR), ultrasonic, or vehicle-to-everything (V2X) (e.g., vehicle-to-vehicle (V2V), V2I, vehicle-to-device (V2D), or vehicle-to-passenger (V2P)) sensor or interface. The sensor 130 can include a global positioning system (GPS) device that can determine a location of the vehicle using map data. The sensor 130 can detect (e.g., using motion sensing, imaging or any of the other sensing capabilities) whether any other vehicle or object is present at or approaching the vehicle 126.

The vehicle 126, via sensor 130 or the onboard computing unit 128, can interface or communicate with a location system via network 101. The location system can include any device based on a positioning system such as Global Navigation Satellite System (GNSS), which can include GPS, GLONASS, Galileo, Beidou and other regional systems. The location system can include one or more cellular towers to provide triangulation. The location system can include wireless beacons, such as near field communication beacons, short-range wireless beacons (e.g., Bluetooth beacons), or Wi-Fi modules. The vehicle 126 can include or interface with a device, component, antenna, or other module or element to determine a location of the vehicle 126 via the location system.

The one or more vehicle 126 can include sensors 130 that are designed, constructed, configured or operational to detect vehicle dynamics information. Sensors 130 can include sensors that detect, for example, an automobile layout, vehicle powertrain information, braking system information, steering information, suspension information, and wheel and tire information. The onboard computing unit 128 or sensors 130 can detect or identify vehicle dynamics information based on aerodynamics information such as drag coefficient, aerodynamics, center of pressure, downforce, ground effect in the vehicle. The onboard computing unit 128 or sensors 130 can detect or identify vehicle dynamics information related to the geometry of the vehicle, such as steering geometry, axle track, camber angle, caster angle, roll center, scrub radius, steering ratio, toe, or wheelbase. The onboard computing unit 128 or sensors 130 can detect or identify vehicle dynamics information related to mass of the vehicle, such as center of mass, moment of inertia, roll moment, sprung mass, unsprung mass, or weight distribution. The onboard computing unit 128 or sensors 130 can detect or identify vehicle dynamics information related to motion of the vehicle, such as body flex, body roll, bump steer, directional stability, critical speed, noise, vibration, harshness, pitch, ride quality, roll, speed wobble, understeer, overstseeer, lift-off oversteer, fishtailing, weight transfer, load transfer, yah. The onboard computing unit 128 or sensors 130 can detect or identify vehicle dynamics information related to tire information, such as camber thrust, circle of forces, contact patch, cornering force, ground pressure, pneumatic trail, radial force variation, relaxation length, rolling assistance, self-aligning torque, slip angle, slip, steering ratio, tire load sensitivity. The onboard computing unit 128 or sensors 130 can detect or identify vehicle dynamics information related to the road or surface of the parking zone, such as banked turn, cross slope, drainage gradient, cant, superelevation, road slipperiness, split friction, surface roughness, or texture. The onboard computing unit 128 can retrieve vehicle dynamics information stored in memory of the vehicle 126.

For example, the vehicle 126 can be located at or proximate to a vehicular travel path, such as a road, street, highway, cul-de-sac, or alley. The sensed data received from the one or more sensors 130 of the vehicle 126 can include, for example, data from one or more sensors 130 such as a camera, infrared camera, image sensor, LIDAR, laser based sensor, radar, transducer, or ultrasonic transducer. Cameras can include, for example, forward facing cameras, rear cameras, 360 degree cameras, stereo or mono cameras, two-dimensional cameras or three-dimensional cameras. For three-dimensional cameras, the sensors 130 can multiple cameras (e.g., three, four, five, six or more) that provide input to the data processing system 102 via interface 104 to generate a three-dimensional image. The cameras can have a high dynamic range, such as 130 dB, 135 dB, 140 dB, 145 dB, or more. The cameras can be digital cameras. The camera can include a forward facing camera configured for short, medium or high ranges, such as in the area between 0.2 yards to 100 yards, 275 yards or more. Medium range cameras can warn the driver about cross-traffic, pedestrians, emergency braking in the car ahead, as well as lane and signal light detection. High range cameras can be used for traffic sign recognition, video-based distance control, and road guidance. A difference between cameras for medium and high range can be the aperture angle of the lenses or field of view. A LIDAR sensor can refer to or include a laser-based system. In addition to the transmitter (laser), the LIDAR sensor system can use a sensitive receiver. The LIDAR sensor can measure distances to stationary as well as moving objects. The LIDAR sensor system can provide three-dimensional images of the detected objects. LIDAR sensors can be configured to provide 360 degree all-round visibility that capture spatial images of objects. LIDAR sensors can include infrared LIDAR systems that use Micro-Electro-Mechanical System ("MEMS"), a rotating laser, or a solid-state LIDAR. The LIDAR sensors can recognize light beams emitted as well as reflected from objects. For example, the LIDAR sensors can use detectors that are configured to measure single photons, such as a Single-Photon Avalanche Diode ("SPAD").

Thus, the vehicle 126 can determine vehicle status information using the one or more sensors 130 and transmit, responsive to receipt of the one or more data packets broadcasted by the roadside computing unit 132, the vehicle status to the roadside computing unit 132. The vehicle 126 can broadcast some or all of the vehicle status information detected by the sensors 130. The vehicle 126 can filter the amount of vehicle status information transmitted to the roadside computing unit 132 based on one or more factors, such as the value of the status, the type of road the vehicle 126 is traversing, or an indication of the type of status information to transmit indicated in the data packets or timestamps broadcast by the roadside computing unit 132. For example, in order to reduce network bandwidth usage or reduce latency or delay in network transmissions, the vehicle 126 can reduce the amount of data transmitted to the roadside computing unit 132. The vehicle 126 can use a policy to determine which fields or values to filter out, remove, or block from transmission to the roadside computing unit 132. For example, if one or more values detected by the sensors 130 is below a threshold value (e.g., zero or 1 or other threshold value for acceleration), then the vehicle 126 can determine not to transmit that status information, thereby reducing the number of fields in the vehicle status data structure being transmitted to the roadside computing unit 132, which, in turn, can reduce the number of fields in the combined vehicle status and road information data structure transmitted by the roadside computing unit 132 to the data processing system 102.

The roadside computing unit 132, upon receiving the status information or other data from the vehicle, can forward the status information to the data processing system 102. The roadside computing unit 132 can also transmit, to the data processing system 102, road information generated by the road info generator 140. The data processing system 102 can, therefore, receive from the roadside computing unit 132 both the road information (e.g., preconfigured information stored in memory of the roadside unit 132 such as road geometry associated with the travel path, a speed limit, or a traffic sign, or a current condition associated with the location on the vehicular travel path).

Thus, the roadside computing unit 132, upon receiving the vehicle status information from vehicle 126, can forward the vehicle status information to the data processing system 102. The roadside computing unit 132 can further transmit the timestamp corresponding to the vehicle status information to the data processing system 102. For example, the vehicle status information received from the vehicle 126 can include the timestamp that was broadcast by the roadside computing unit 132 to the vehicle 126, which broadcast caused the vehicle 126 to respond with the vehicle status information. Thus, the roadside computing unit 132 can assign the timestamp initially broadcast by the roadside computing unit to the vehicle status information received from vehicle 126 as well as the road information. The roadside computing unit 132 can transmit the road information corresponding to the timestamp and the vehicle status information corresponding to the timestamp to the data processing system 102. The roadside computing unit 132 can generate a combined data structure with fields corresponding to the timestamp, road information, and vehicle status information. The roadside computing unit 132 can generate multiple data structures; for example, a first data structure can include the timestamp and the road information, and a second data structure can include the same timestamp and the vehicle status information. The roadside computing unit 132 can transmit the one or more data structures using one or more data packets via network 101 to the data processing system 102.

The data processing system 102 can include an interface 104. The data processing system 102 can include an interface 102 designed, configured, constructed, or operational to receive and transmit information. The interface 104 can receive and transmit information using one or more protocols, such as a network protocol. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can be designed, constructed or operational to communicate with one or more sensors 130 to collect or receive information. The interface 104 can be designed, constructed or operational to communicate with a master clock 134, controller component 106, deep learning engine 108 or data repository 116. For example, the interface 104 can communicate or interact with a roadside computing unit 132 or a vehicle 126 to generate a vehicle command to control the vehicle 126.

The interface 104 of the data processing system 102 can receive data from the roadside computing unit 132. The data processing system 102 can receive the one or more data structures generated by the roadside computing unit 132 comprising the timestamp, road information, and vehicle status information. For example, the data processing system 102 can receive the vehicle status information sensed by one or more sensors 130 mounted on the vehicle 126. The interface 104 of the data processing system 102 can receive data from the roadside computing unit 132. The data processing system 102 can be in communication with the roadside computing 132. For example, the data processing system 102 can establish a communication channel with the roadside computing 132. The data processing system 102 can establish a communication channel with multiple roadside computing units 132. The data processing system 102 can ping the roadside computing unit 132 for data. The data processing system 102 can query or transmit a request to the roadside computing unit 132 for data. The data processing system 102 can ping, query, or transmit a request to the roadside computing unit 132 for information based on a time interval, periodically, or responsive to a condition or event.

The roadside computing unit 132 can transmit data to the data processing system 102. The roadside computing unit 132 can transmit data to the data processing system 102 with or without receiving a ping, query or request from the data processing system 102. For example, the data processing system 102 fetch data from the roadside computing unit 132, or the roadside computing unit 132 can push data to the data processing system 102. The roadside computing unit 132 can transmit data to the data processing system 102 responsive to receiving an indication from vehicle 126. For example, the roadside computing unit 132 can broadcasts timestamps. As a vehicle 126 comes within range of the roadside computing 132, the onboard computing unit 128 of the vehicle can detect the broadcast from the roadside computing unit 132. Responsive to receiving the broadcast from the roadside computing unit 132, the vehicle 126 can transmit vehicle status information. The onboard computing unit 128 can determine status of the vehicle including, for example, a position, speed, acceleration, turn angle, throttle, or brake status of the vehicle 126.

The roadside computing unit 132 can transmit aggregated vehicle status information from one or more vehicles, or serially transmit the vehicle status information for multiple vehicles. For example, the roadside computing unit 132 can receive, within a predetermined time window based on receipt of the status of a first vehicle 126, a status from each of a plurality of nearby vehicles different from the first vehicle 126. The roadside computing unit 132 can generate second one or more data packets including the status from each of the multiple nearby vehicles received within the predetermined time window, and provide the status information for the multiple vehicles to the data processing system 102.

Thus, the roadside computing unit 132 can receive the status of the first vehicle transmitted by the first vehicle, identify road information, generate one or more data packets including the status of the vehicle, and information associated with the location in the vehicular travel path, and transmit the one or more data packets to the data processing system 102. By having the roadside computing unit 132 act as the intermediary between the vehicle 126 and data processing system 102 with regard to broadcasting time stamps and forwarding vehicle status information, the system 100 can reduce network latency and the amount of power used for wireless transmissions relative to the vehicle 126 transmitting the vehicle status data directly to the data processing system 102, or the vehicle 126 receiving the timestamps directly from the data processing system 102. For example, the vehicle status information may include a large amount of data, and it may be challenging for the vehicle 126 to establish a fast wireless communication channel directly with the data processing system 102. However, due to the close proximity of the roadside computing unit 132 to the vehicle 126 relative to the data processing system 102, the roadside computing unit 132 can establish, using short or mid-range wireless networking protocol having a high bandwidth and low latency, such as Bluetooth or a V2I protocol, a wireless communication with the vehicle 126 over which the vehicle 126 can transmit the vehicle status information.

The data processing system 102 can receive, obtain or collected data from the roadside computing unit 132 include the vehicle status information and the road information. The data processing system 102 can input the status information of the vehicle 126 and the road information (e.g., information associated with the location at which the roadside computing unit 132 is located on the vehicular travel path) into a deep learning engine 108.

The data processing system 102 can include a deep learning engine 108 designed, constructed and operational to process status information associated with one or more vehicles and road information to generate, identify, determine or assign a label to the vehicle 126. The vehicle 126 can be referred to as a target vehicle. The data processing system 102 can input, into the deep learning engine 108, the status information of the target vehicle as well as other nearby vehicles from which the data processing system 102 receives vehicle status information within a predetermined time window of the target vehicle. The deep learning engine 108 can include or utilize a neural network (e.g., neural network 300 depicted in FIG. 3) having an input layer 108, one or more hidden intermediary layers 112, and an output layer 114.

The deep learning engine 108 can include a neural network, machine learning engine, or model. For example, the deep learning engine 108 can include a convolution neural network. The deep learning engine 108 can include any type of neural network including, for example, a convolution neural network, deep convolution network, a feed forward neural network, a deep feed forward neural network, a radial basis function neural network, a Kohonen self-organizing neural network, a recurrent neural network, a modular neural network, a long/short term memory neural network, etc.

The deep learning engine 108 can maintain, manage, store, update, tune, or configure the one or more neural networks. The deep learning engine 108 can use different parameters, weights, training sets, or configurations for the neural network or the one or more hidden intermediary layers 112 to allow the neural networks to efficiently and accurately process a type of input (or intermediary input) and generate a type of output (or intermediary output). By configuring and tuning the neural network or each hidden intermediary layer thereof, the data processing system 102 can improve the efficiency, reliability and accuracy with which labels are assigned to a vehicle and vehicle commands are generated, relative to not using a neural network or not using a neural network that has been trained or configured to process vehicle status information and road information.

For example, the deep learning engine 108 can be configured as or include a convolution neural network. The convolution neural network can include one or more convolution cells (or pooling layers) and kernels, that can each serve a different purpose. The input layer 110 can include a convolution kernel that can process input data, and the pooling layers can simplify the data, using, for example, non-linear functions such as a max, thereby reducing unnecessary features. The vehicle status information and road information can be passed to convolution layers that form a funnel, compressing detected features. The first layer can detect first characteristics, the second layer can detect second characteristics, and so on.

The convolution neural network can be a type of deep, feed-forward artificial neural network configured to analyze visual imagery. The convolution neural network can include multilayer perceptrons designed to use minimal preprocessing. The convolution neural network can include or be referred to as shift invariant or space invariant artificial neural networks, based on their shared-weights architecture and translation invariance characteristics. Since convolution neural networks can use relatively less pre-processing compared to other classification algorithms, the convolution neural network can automatically learn the filters that may be hand-engineered for other classification algorithms, thereby improving the efficiency associated with configuring, establishing or setting up the neural network, thereby providing a technical advantage relative to other classification techniques.

The deep learning engine can use a neural network such as a convolution neural network designed and constructed to have an input layer 110 and an output layer 114. The neural network can have one or more hidden intermediary layers that can include convolution layers, pooling layers, fully connected layers, or normalization layers. For example, in a convolution layers, the data processing system 102 can apply a convolution operation to the input, passing the result to the next layer. The convolution can emulate the response of an individual neuron to visual stimuli. Each convolutional neuron processes data only for its receptive field. Using the convolution operation can reduce the number of neurons used in the neural network as compared to a fully connected feedforward neural network. Thus, the convolution operation brings a technical solution to this problem as it reduces the number of free parameters, allowing the network to be deeper with fewer parameters. In this way, the deep learning engine 108 with a convolution neural network can resolve the vanishing or exploding gradients problem in training traditional multi-layer neural networks with many layers by using backpropagation.

The deep learning engine 108 configured with a convolution neural network can include one or more pooling layers. The one or more pooling layers can include local pooling layers or global pooling layers. The pooling layers can combine the outputs of neuron clusters at one layer into a single neuron in the next layer. For example, max pooling can use the maximum value from each of a cluster of neurons at the prior layer. Another example is average pooling, which can use the average value from each of a cluster of neurons at the prior layer.

The deep learning engine 108 configured with a convolution neural network can include fully connected layers. Fully connected layers can connect every neuron in one layer to every neuron in another layer. The deep learning engine 108 configured with a convolution neural network can be configured with shared weights in convolutional layers, which can refer to the same filter being used for each receptive field in the layer, thereby reducing a memory footprint and improving performance of the neural network.

The hidden intermediary layers 112 in the convolution neural network can include filters that are tuned or configured to detect information based on the vehicle status information and the road information received at the input layer 110. As the data processing system 102 steps through each layer in the convolution neural network, the data processing system 102 can translate the input from a first layer and output the transformed input to a second layer, and so on. The convolution neural network can include one or more hidden intermediary layers 112 based on the type of object or information being detected and the type of input vehicle status information or road information.

The data processing system 102 can train the neural network of the deep learning engine 108 using historical data. The neural network can be trained on one or more servers of the data processing system 102 or remote from the data processing system 102. The neural network of the deep learning engine 108 can be trained to process, analyze, or use vehicle status information from the target vehicle 126 and road information from the roadside computing unit 132 to determine a driving style of the vehicle 126 (e.g., of the driver of the vehicle 126) in order to assign a driving style label to the vehicle 126, which can then be used by the vehicle 126 to generate a vehicle command to control the vehicle 126 or one or more nearby vehicles. The neural network of the deep learning engine 108 can be trained to process, analyze, or use vehicle status information from one or more nearby vehicles in addition to the vehicle status of the target vehicle 126 and road information from the roadside computing unit 132 to determine a driving style of the vehicle 126 (e.g., of the driver of the vehicle 126) in order to assign a driving style label to the vehicle 126, which can then be used by the vehicle 126 to generate a vehicle command to control the vehicle 126 or the one or more nearby vehicles.

The data processing system 102 can assign, based on an output from the deep learning engine 108, a label (e.g., labels 122 stored in data repository 116) to the first vehicle. The data processing system 102, using the deep learning engine 108, can label vehicle 126 as a tailgater, speeder, lane shifter, aggressive driver, fair-weather driver, or slow driver, for example. The data processing system 102 can output, via output layer 114 of the deep learning engine 108, a driving style to assign to the target vehicle 126, or one or more nearby vehicles 126. To do so, the data processing system 102 can input vehicle status information (e.g., location, speed, acceleration, turn angle, throttle level, brake level, or other sensor information) for the target vehicle 126 as well as one or more nearby vehicles 126 into the input layer 110 of the neural network. The data processing system 102 can input road information (e.g., road geometry, speed limit assigned to the road, traffic signs on the road, current traffic signal, or other regulations for the road) to the input layer 110 of the neural network. The data processing system 102 (e.g., via deep learning engine 108) can analyze this information to assign a driving style label to the target vehicle 126. For example, if the velocity of the vehicle 126 is greater than a threshold amount of the speed limit for the location of the road corresponding to the roadside computing unit 126, the data processing system 102 can determine, using the deep learning engine 108, to assign a label of speeder to the target vehicle 126. However, if the average velocity of nearby vehicles 126 detected within a time window of the timestamp corresponding to the target vehicle (e.g., a time window of 15 seconds, 30 seconds, 1 minute, 5 minutes, 10 minutes, 15 minutes, 30 minutes or other window relevant for the status field), then the data processing system 102 can determine, using the deep learning engine 108, not to label the target vehicle 126 a speeder even the target vehicle 126 may be speeding because the target vehicle 126 is determined to be travelling at the pace of traffic at that time.

In another example, the data processing system 102 can determine to label the target vehicle 126 as a speeder even if the target vehicle is travelling below the speed limit as determined via the road information generator 140 of the roadside computing unit 132, because the average velocity of nearby vehicles within the time window can be a certain percentage (e.g., 15%, 20%, 25%, or 30%) less than the velocity of the target vehicle 126.

The data processing system 102 can take additional vehicle dynamics information into account, such as acceleration, turn angle, brake level, accelerometer information or other sensor information to assign the label to the target vehicle 126. For example, if the g-force experienced by the target vehicle 126 is greater than the predetermine g-force range set for the location, as stored in the roadside computing unit 132, then the data processing system 102 can label the driver as an aggressive driver. The data processing system 102 can compare the g-force measurements for the target vehicle 126 relative to nearby drivers corresponding to the time window, or historical drivers, to determine whether the target vehicle 126 is aggressive.

The data processing system 102 can determine a distance between the target vehicle 126 and one or more nearby vehicles 126 to determine to label the target vehicle 126 a tailgater. For example, the data processing system 102 can use sensor information to determine the distance between vehicles 126 within a time window. The data processing system 102 can determine the average distance between vehicles 126 within the time window, as well as other statistical information associated with distances between vehicles, such as the standard deviation, or percentiles corresponding to specific distances. The data processing system 102 can then determine, using the deep learning engine 108, whether the distance provided by the target vehicle 126 and other nearby vehicles is within a predetermined number of standard deviations of the average distance provided by other nearby vehicles 126 corresponding to the time window. If the data processing system 102 determines that the distance provided by the target vehicle 126 falls below the average distance by one or more standard deviations, then the data processing system 102 can assign a label of tailgater to the target vehicle 126.

The data processing system 102 can select a vehicle command based on the label assigned via the deep learning engine 108. The data processing system 102 can transmit the vehicle command to the target vehicle 126, or one or more nearby vehicles 126, to execute an action for traversing the vehicular path. To select the command, the data processing system 102 can use a mapping or model 120. The data processing system 102 can select a command to control the target vehicle 126 or one or more nearby vehicles 126 based on the driving style determined for the target vehicle 126.

The data processing system 102 (e.g., via controller component 106) can generate a command including an instruction to cause the onboard computing unit 128 of the vehicle 126 to execute an action such as displaying a notification via a display device 144 (e.g., vehicle dash, LCD, LED, or other electronic or digital visual display communicatively coupled to the onboard computing unit 126). For example, the visual output can include an alert, notification, warning, or suggestion to adjust a driving style based on the determined driving style for the target vehicle 126. The data processing system 102 can provide the determined driving style to an autonomous vehicle to facilitate the autonomous vehicle adjusting a driving style, driving speed, driving location, or other driving characteristic. For example, the autonomous vehicle may be a nearby vehicle that is nearby to a target vehicle labeled as being a tailgater. The autonomous vehicle can be directly in front of the target vehicle labeled as a tailgater. Responsive to receiving an indication from the data processing system 102 that the target vehicle 126 has been labeled as a tailgater, the autonomous vehicle being tailgated can shift lanes on the highway to allow the tailgater vehicle to pass, thereby improving autonomous vehicle operation. In another example, the data processing system 102 can transmit a command including an instruction to the vehicle 126 to provide a notification that an emergency vehicle is nearby to the vehicle 126.

In another example, the data processing system 102 can transmit a command to the target vehicle 126 to control or adjust a characteristic of driving of the target vehicle, such as slowing down the vehicle, adjusting a suspension or handling feature of the vehicle, or displaying an alert or warning to the driver of the target vehicle 126.

The data processing system 102 can utilize a second neural network to generate the commands to control the vehicle 126 or nearby vehicles 126 to traverse the vehicular travel path based on the determined label. The data processing system 102 can input the determined label and proximity to nearby vehicles into the second neural network along with road information to generate the control command. The second neural network can be trained, tuned, or configured to generate output controls based on an input label and road information. The neural network 120 can be trained to generate the appropriate controls for the type of vehicle 126. The second neural network can generate improved controls relative to a hand-made algorithm because the second neural network can generate controls that may efficiently and smoothly control the nearby vehicle to traverse the vehicular travel path based on the determined label for a different target vehicle. For example, the second neural network can be trained to weight controls that reduce sudden acceleration, de-acceleration, or changes in direction or orientation. The second neural network can be trained to generate steering commands that are in synchronization with acceleration controls or braking controls. The second neural network can be trained to reduce resource consumption, battery consumption, gas consumption, or brake pad consumption.

The second neural network can be maintained by the deep learning engine 108. The second neural network can include one or more component or functionality of the neural network 300 depicted in FIG. 3. The second neural network can be a same type of neural network as the neural network 300, such as a convolution neural network. However, the second neural network can be trained using data sets that include vehicle commands and vehicle control information, as opposed to the vehicle status information or road information. The second neural network can generate commands or instructions to control the vehicle 126 or a nearby vehicle to traverse the vehicular travel path, as opposed to generating a label for the target vehicle 126 as in the first neural network. For example, the roadside computing unit 132 can generate data packets comprising a status from each of a plurality of nearby vehicles received within a predetermined time window, and the data processing system 102 can input the status of each of the plurality of nearby vehicles into the deep learning engine 108 to assign a label to each of the plurality of nearby vehicles, and transmit a vehicle command to at least one vehicle of the plurality of nearby vehicles to cause the at least one vehicle to execute an action for traversing the vehicular path.

As the data processing system 102 receives updated status information for the one or more vehicles 126 from one or more roadside computing units 132, the data processing system 102 can generate an updated label for the target vehicle 126 based on the previous status information and the updated status information or any subsequent status information. The data processing system 102 can continually update or regenerate labels for a vehicle 126 as updated status and road information is received from roadside computing units 132 for the target vehicle 126 as well as other nearby vehicles 126 (which can be different from the set of nearby vehicles previously used by the data processing system 102 to generate the status information). Thus, the data processing system 102 can continually or periodically update the label for the vehicle 126 based on a current status and road information.

In some cases, the data processing system 102 can transmit the label to a third-party entity or a computing device of a third party. For example, a third-party can perform remote monitoring and management of the vehicle 126 or an aspect thereof. The third-party entity can be authorized by the vehicle 126 or owner or driver of vehicle 126 to receive the label or other command information from the data processing system 102. The third-party entity can use the label or control information to perform remote monitoring or management services, such as diagnostic checks to determine whether the vehicle is performing as intended or if the vehicle 126 is malfunctioning. The third-party entity computing device can transmit a software package or patch to update a software configuration of the vehicle 126 responsive to receiving the label or control or command information from the data processing system 102. In some cases, the third party entity can perform logging or profile generation for the vehicle 126 using the label.

Figure 2:
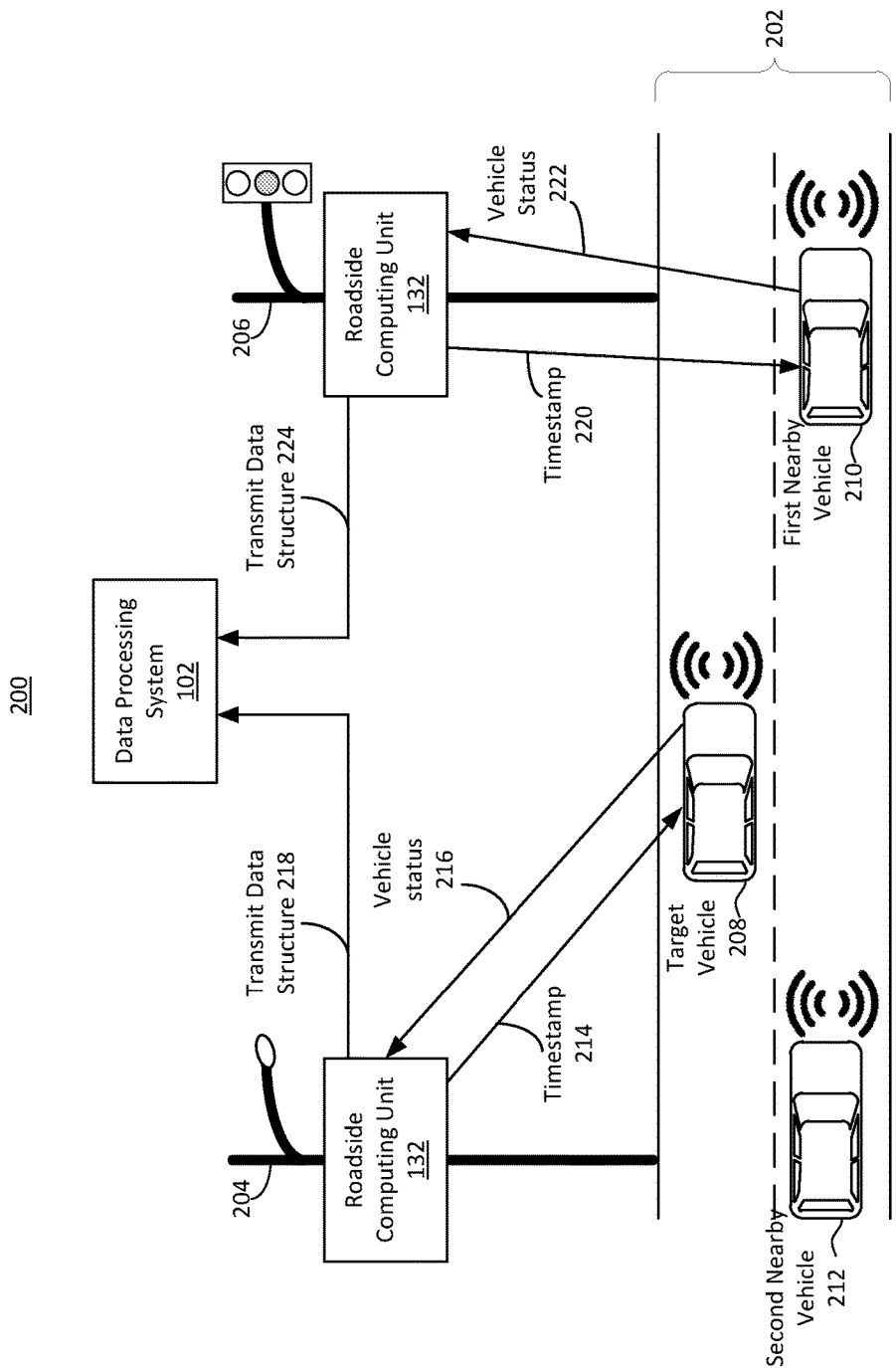
FIG. 2 depicts an example operational diagram for commanding vehicles via a vehicle-to-infrastructure communication network, in accordance with an implementation.

FIG. 2 depicts an example operational diagram for commanding vehicles via a vehicle-to-infrastructure communication network. The system 200 can include one or more component or functionality depicted in FIG. 1, including, for example the data processing system 102, roadside computing unit 132, or vehicles 116. For example, the target vehicle 208, the first nearby vehicle 210 and the second nearby vehicle 212 can include one or more component or functionality of vehicle 126 depicted in FIG. 1.

The system 200 can include a roadside computing 132 located on a street light 204 and a roadside computing unit 132 located on a traffic light 206. The street light 204 and the traffic light 206 can be located at respective locations on or adjacent to a vehicular travel path 202 (e.g., a road, 2-lane road, 3-lane road, or highway).

The roadside computing unit 132 can broadcast a timestamp at 214. The target vehicle 208 can receive the broadcasted timestamp 214. Responsive to receiving the broadcasted timestamp 214, the target vehicle 208 can transmit vehicle status information 216 to the roadside computing unit 132 that broadcasted the timestamp 214. The target vehicle 208 can transmit the vehicle status 216 using a vehicle-to-infrastructure communication protocol. The roadside computing unit 132 can transmit a data structure 218 that includes road information and the vehicle status 216 to the data processing system 102. The data structure 218 can include one or fields with one or more values. For example, the data structure 218 can include a first field for road information and a first value with a value for the road information. The road information field can include subfields, such as road_information{speed}; road_information{location}; or road_information{traffic_light_color}. The corresponding values can include, for example, road_information{speed}=55 miles per hour; road_information{location}=latitude and longitude coordinate; or road_information{traffic_light_color}=green. The data structure 218 can include fields and values for vehicle status, such as vehicle_status{current_speed}=60 miles per hour.

The first nearby vehicle 210 can receive a timestamp 220 broadcasted by the roadside computing unit 132 located on the traffic light 206. Responsive to receiving the timestamp 220, the first nearby vehicle 210 can determine vehicle status 222 and transmit the vehicle status 222 to the roadside computing unit 132 located on the traffic light 206. The roadside computing unit 132 can determine current road information (e.g., the color of the traffic light such as yellow, green or red) and then generate a data structure 224 with the road information and vehicle status 222. The data structure 224 can include similar information or similar format as compared to data structure 218, such as road_information{speed}; road_information{location}; road_information{traffic_light_color}; or vehicle_status{current_speed}. The roadside computing unit 132 located on the traffic light 206 can transmit the data structure 224 to the data processing system 102. The second nearby vehicle 212 can also receive a timestamp and transmit vehicle information to one of the roadside computing units 132.

As the target vehicle 208 travels along the road 202, the target vehicle 208 can receive timestamps broadcast by the roadside computing unit 132 located on the traffic light 206, and then transmit updated vehicle information to the roadside computing unit 132 located on the traffic light 206. The roadside computing unit 132 located on the traffic light can transmit an updated current road information (e.g., current traffic light signal) along with the updated the vehicle status information to the data processing system 102.

Figure 3:
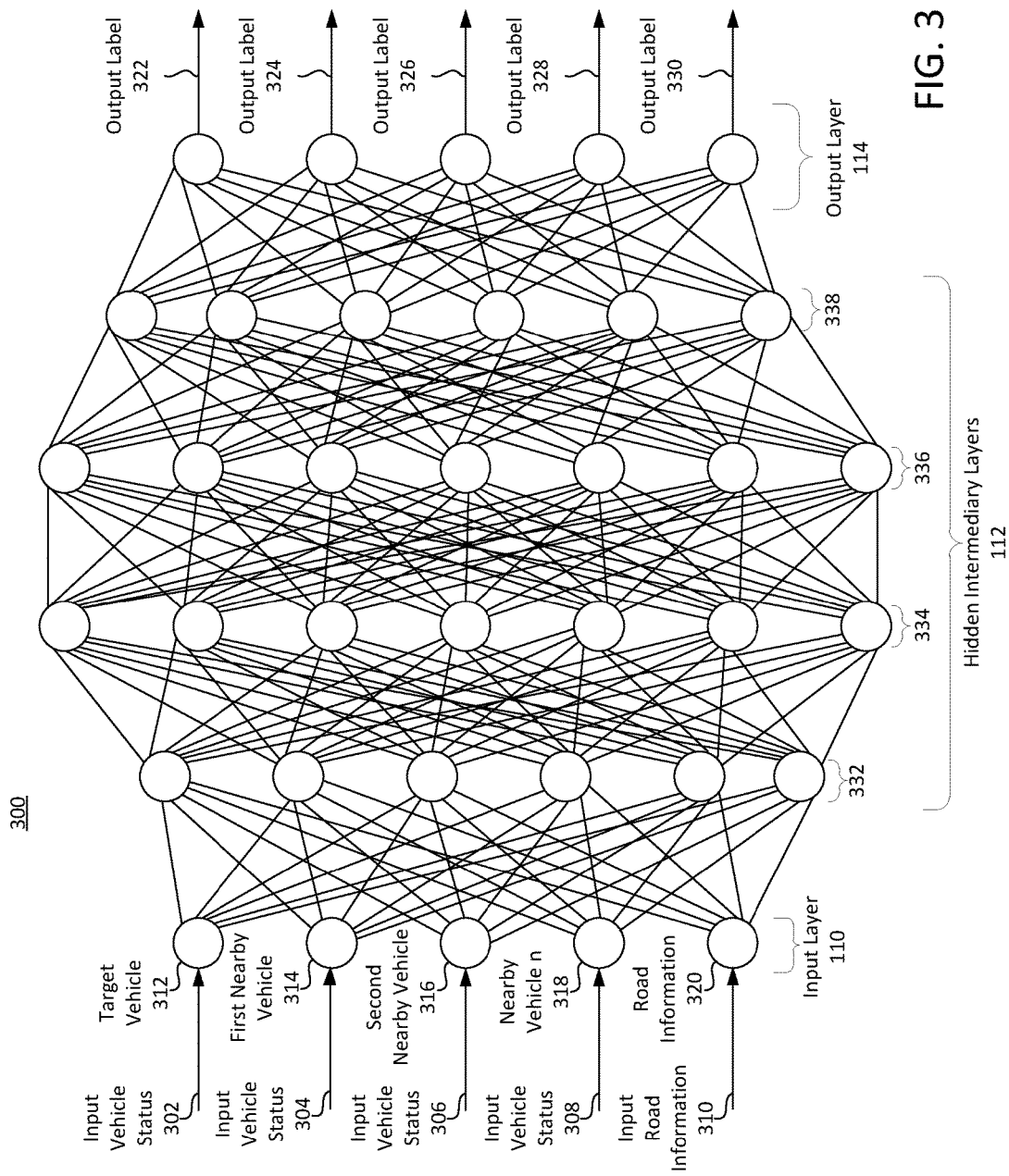
FIG. 3 depicts an example of neural network used by a deep learning engine to command vehicles via a vehicle-to-infrastructure communication network, in accordance with an implementation.

FIG. 3 depicts an example operation of a neural network used by a deep learning engine to command vehicles via a vehicle-to-infrastructure communication network. The operation can be performed by one or more system, component or function depicted in FIG. 1, FIG. 2 and FIG. 5. For example, the operation can be performed by or via a data processing system, deep learning engine, controller component, roadside computing unit, sensors, or a vehicle onboard computing unit.

At ACT 302, the data processing system can input vehicle status for the target vehicle 208 into the target vehicle node 312 at the input layer 110 of the neural network 300. At ACT 304, the data processing system can input vehicle status for the first nearby vehicle 210 into the first nearby vehicle node 314 at the input layer 110 of the neural network 300. At ACT 306, the data processing system can input vehicle status for the second nearby vehicle 212 into the second nearby vehicle node 316 at the input layer 110 of the neural network 300. At ACT 308, the data processing system can input vehicle status for the additional nearby vehicles into the nearby vehicle node 318 at the input layer 110 of the neural network 300. At ACT 310, the data processing system can input road information into the road information node 320 at the input layer 110 of the neural network 300.

Subsequent to input ACTS 302, 304, 306, 308 and 310, the data processing system can pass the input information to shared convolution layers of the neural network 300. The input layer 110 can be trained, configured or operational to receive, as input, the vehicle status and road information, and output data to the hidden intermediary layers 112. The neural network can include multiple hidden intermediary layers, such as a first hidden intermediary layer 332, a second hidden intermediary layer 334, a third hidden intermediary layer 336, and a fourth hidden intermediary layer 338. The neural network can include an output layer 114.

The hidden intermediary layers 112 can be convolution layers, pooling layers, fully connected layers, or weighted layers. Each node in the layer can perform a process or operation on the data. Each node or layer can transform an input data to generate an output data (e.g., an intermediate output that can be passed to a subsequent layer, or a final output passed to another component in the system).

For example, the first input layer 110 can receive the vehicle status and road information data, process the data to transform the data to a first intermediate output, and forward the first intermediate output to a first hidden intermediary layer 332. The first hidden intermediary layer 332 can receive the first intermediate output, process the first intermediate output to transform the first intermediate output to a second intermediate output, and forward the second intermediate output to a second hidden intermediary layer 334. The second hidden intermediary layer 334 can receive the second intermediate output, process the second intermediate output to transform the second intermediate output to a third intermediate output, and forward the third intermediate output to a third hidden intermediary layer 336. The third hidden intermediary layer 336 can receive the third intermediate output, process the third intermediate output to transform the third intermediate output to a fourth intermediate output, and forward the fourth intermediate output to a fourth hidden intermediary layer 336. The fourth hidden intermediary layer 338 can receive the fourth intermediate output, process the fourth intermediate output to transform the fourth intermediate output to a fifth intermediate output, and forward the fifth intermediate output to an output layer 114. The output layer 114 can receive the fifth intermediate output, process the fifth intermediate output to transform the fifth intermediate output to a final output, and forward the final output. The final output can include an output driving style label, such as output label 322 for target vehicle node 312, output label 324 for first nearby vehicle node 314, output label 326 for second nearby vehicle node 316, output label 328 for an additional nearby vehicle node 318, and an output label 330 for the road information node 320. The output labels 322 to 328 can correspond to, for example, a driving style, such as a tailgater, speeder, lane shifter, aggressive driver, fair-weather driver, or slow driver. An output label 330 can correspond to road information, an indicate a characteristic of the traffic flow of the road based on aggregated data, such as heavy traffic, rush hour traffic, slow moving traffic, medium traffic, low traffic, traffic flowing smoothly at speed limit, traffic accident, or dangerous driving conditions due to weather. Thus, the neural network 300 can be configured, trained, tuned or operational to receive vehicle status information and road information and output labels using a convolution neural network having one or more hidden layers.

Figure 4:
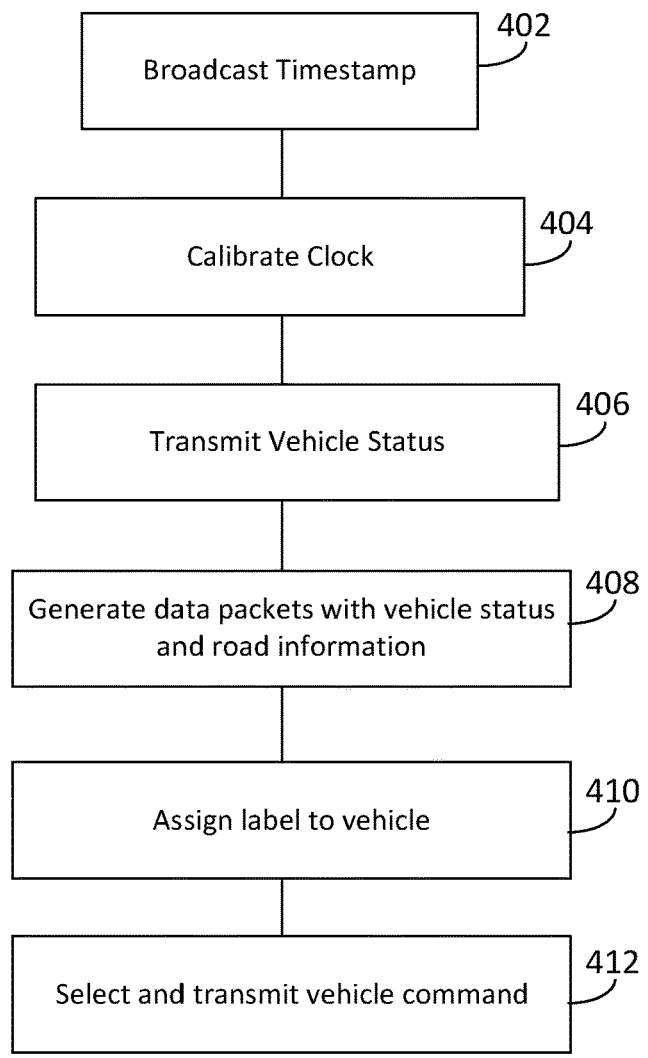
FIG. 4 depicts a flow diagram depicting an example method of commanding vehicles via a vehicle-to-infrastructure communication network, in accordance with an implementation.

FIG. 4 depicts a flow diagram depicting an example method of commanding vehicles via a vehicle-to-infrastructure communication network, in accordance with an implementation. The method 400 can be performed by one or more system, component or function depicted in FIG. 1, 2, 3, or 5, including, for example, by a data processing system, controller component, deep learning engine, neural network, roadside computing unit, vehicle onboard computing unit, or sensors. At ACT 402, the roadside computing unit can broadcast timestamps. The roadside computing unit can be positioned at a location in a vehicular travel path (e.g., a first location corresponding to street light 204 depicted in FIG. 2). The roadside computing unit can broadcast one or more data packets including a timestamp. The roadside computing unit can periodically or continuously broadcast the timestamps.

At ACT 404, the vehicle can receive the timestamp and calibrate an internal clock. The vehicle can include an onboard computing unit that receives the data packets with the timestamp broadcasted by the roadside computing unit at the first location. The onboard computing unit can calibrate an internal clock based on the timestamp. The onboard computing unit can synchronize the internal clock or syntonize the internal clock based on one or more timestamps. For example, upon receiving multiple timestamps, the onboard computing unit can determine a rate of counting time, and then adjust the frequency of the internal clock based on the rate based on receiving multipole timestamps.

At ACT 406, the vehicle can transmit a vehicle status. The onboard computing unit can transmit the status of the vehicle responsive to receipt of the one or more data packets. The onboard computing unit can transmit the status to the same roadside computing unit that provided the timestamp. In some cases, the vehicle can transmit the vehicle status to a next roadside computing unit depending on which roadside computing unit is closer to the vehicle at the time of transmission.

At ACT 408, the roadside computing unit can generate data packets with the vehicle status and the road information. The roadside computing unit can receive the status of the first vehicle. The roadside computing unit can generate a second one or more data packets having the status of the vehicle and information associated with the location in the vehicular travel path where the roadside computing unit is positioned. The roadside computing unit can transmit the second one or more data packets to the data processing system.

At ACT 410, the data processing system can assign a label to the vehicle. The data processing system can input the status information of the vehicle and the information associated with the location into a deep learning engine. The data processing system can assign, based on an output from the deep learning engine, a label to the vehicle.

At ACT 412, the data processing system can select and transmit a vehicle command. For example, the data processing system can select a vehicle command based on the label, and transmit the vehicle command to the first vehicle to cause the first vehicle to execute an action for traversing the vehicular path. The vehicle command can include an alert, notification, warning, indication, or a control command that causes the vehicle to execute an action for traversing the vehicular travel path. The action can include displaying or sounding the alert, notification, warning, indication or executing the control command to adjust a driving aspect of the vehicle.

Figure 5:
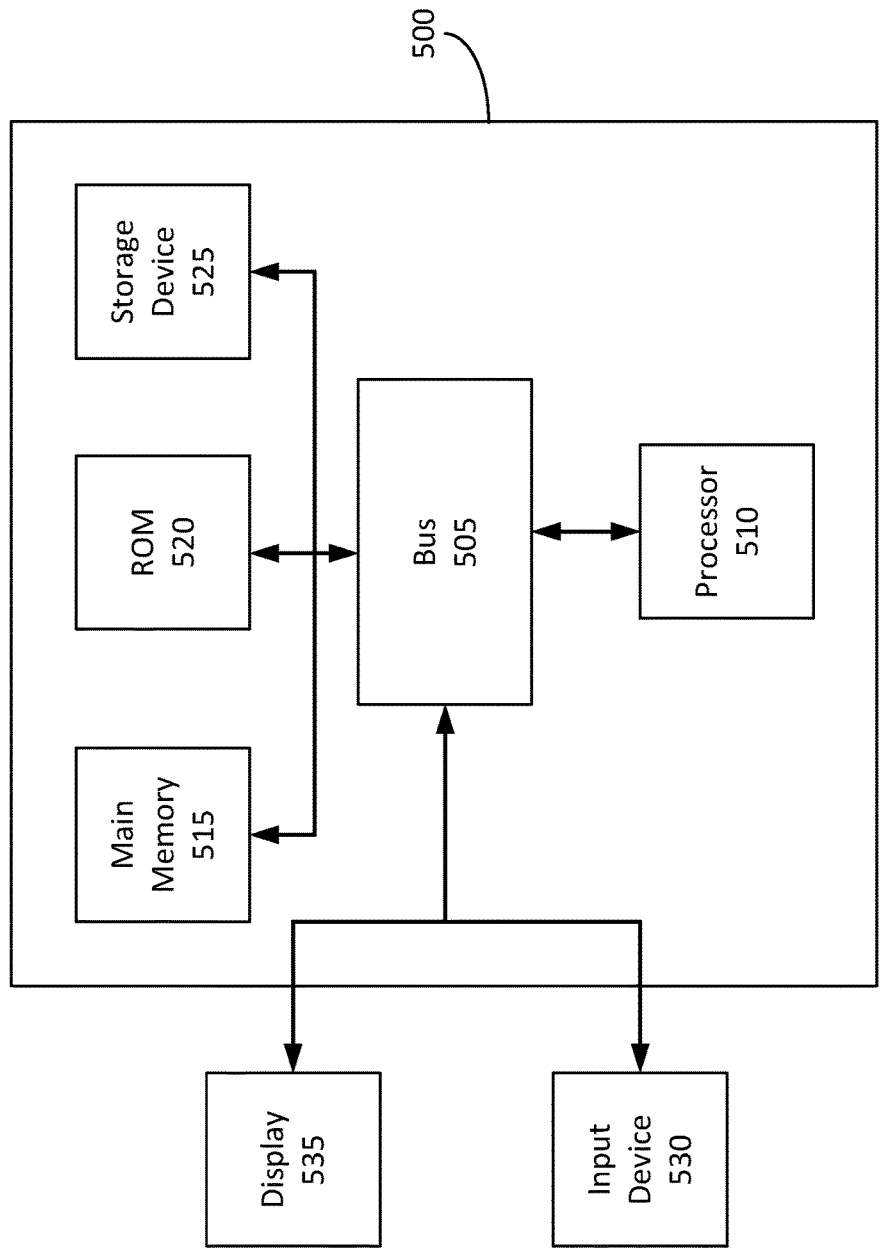
FIG. 5 is a block diagram illustrating an architecture for a computer system that can be employed to implement elements of the systems and methods described and illustrated herein, including, for example, the systems depicted in FIG. 1, operations or examples depicted in FIGS. 2 and 3, and the method depicted in FIG. 4.

FIG. 5 is a block diagram of an example computer system 500. The computer system or computing device 500 can include or be used to implement the data processing system 102, or its components such as the data processing system 102. The computing system 500 includes at least one bus 505 or other communication component for communicating information and at least one processor 510 or processing circuit coupled to the bus 505 for processing information. The computing system 500 can also include one or more processors 510 or processing circuits coupled to the bus for processing information. The computing system 500 also includes at least one main memory 515, such as a random access memory (RAM) or other dynamic storage device, coupled to the bus 505 for storing information, and instructions to be executed by the processor 510. The main memory 515 can be or include the memory 112. The main memory 515 can also be used for storing position information, vehicle information, command instructions, vehicle status information, environmental information within or external to the vehicle, road status or road condition information, or other information during execution of instructions by the processor 510. The computing system 500 may further include at least one read only memory (ROM) 520 or other static storage device coupled to the bus 505 for storing static information and instructions for the processor 510. A storage device 525, such as a solid state device, magnetic disk or optical disk, can be coupled to the bus 505 to persistently store information and instructions. The storage device 525 can include or be part of the memory 112.

The computing system 500 may be coupled via the bus 505 to a display 535, such as a liquid crystal display, or active matrix display, for displaying information to a user such as a driver of the vehicle 126 or the second vehicle 102. An input device 530, such as a keyboard or voice interface may be coupled to the bus 505 for communicating information and commands to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 (e.g., on a vehicle dashboard) can be part of the data processing system 102, the sensor 130, or other component of FIG. 1, as well as part of the vehicle external to the data processing system 102, for example.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components (e.g., arbitration component), and the positioning component 105 and map data illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

What is claimed is:

1. A system to command vehicles via a vehicle-to-infrastructure communication network, comprising:
    a first roadside computing device positioned at a first location in a vehicular travel path, the first roadside computing device to broadcast one or more data packets comprising a timestamp;
    a first vehicle comprising an onboard computing device to:
        receive the one or more data packets broadcast by the first roadside computing device;
        calibrate an internal clock of the first vehicle to match a frequency of a clock of the roadside computing device based on the timestamp received via the one or more data packets broadcast by the first roadside computing unit; and
        transmit, responsive to receipt of the one or more data packets and calibration of the internal clock, a status of the first vehicle to the first roadside computing device; the first roadside computing device to:
        receive the status of the first vehicle transmitted by the first vehicle;
        generate a second one or more data packets comprising the status of the first vehicle, and information associated with the first location in the vehicular travel path; and
        transmit the second one or more data packets to a data processing system;
    the data processing system comprising one or more processors and memory, a command generator component and a deep learning engine, the data processing system to:
        input the status of the first vehicle and the information associated with the first location into the deep learning engine;
        assign, based on an output from the deep learning engine, a label to the first vehicle;
        select a vehicle command based on the label; and
        transmit the vehicle command to the first vehicle to execute an action for traversing the vehicular travel path.

2. The system of claim 1, wherein the first roadside computing device comprises a traffic light controller, comprising:
    the first roadside computing device to determine a current light status; and
    provide the current light status with the information associated with the first location in the vehicular travel path.

3. The system of claim 1, comprising:
    the first roadside computing device to:
        receive, within a predetermined time window based on receipt of the status of the first vehicle, a status from each of a plurality of nearby vehicles different from the first vehicle; and
        generate the second one or more data packets comprising the status from each of the plurality of nearby vehicles received within the predetermined time window; and the data processing system to:
        input the status of each of the plurality of nearby vehicles into the deep learning engine to assign a label to each of the plurality of nearby vehicles.

4. The system of claim 1, comprising:
    the first roadside computing device to generate the second one or more data packets comprising a status from each of a plurality of nearby vehicles received within a predetermined time window; and
    the data processing system to:
        input the status of each of the plurality of nearby vehicles into the deep learning engine to assign a label to each of the plurality of nearby vehicles; and transmit a second vehicle command to at least one vehicle of the plurality of nearby vehicles to cause the at least one vehicle to execute an action for traversing the vehicular travel path.

5. The system of claim 1, comprising:
the onboard computing device of the first vehicle to synchronize or syntonize the internal clock based on the timestamp to calibrate the internal clock; and
transmit the status of the first vehicle along with a calibrated timestamp produced by the internal clock.

6. The system of claim 1, comprising:
the data processing system to determine the output via the deep learning engine configured based on a neural network having an input processing layer, an output processing layer, and a plurality of processing layers intermediary to the input layer and the output layer.

7. The system of claim 1, comprising:
the data processing system to use the deep learning engine to generate the label comprising a driving style.

8. The system of claim 1, comprising:
the data processing system to select the vehicle command comprising an instruction to cause the onboard computing device of the first vehicle to display a notification via a display device communicatively coupled to the onboard computing device.

9. The system of claim 1, comprising:
the data processing system to select the vehicle command comprising an instruction to cause the onboard computing device of the first vehicle to adjust a speed of the first vehicle.

10. The system of claim 1, comprising:
the onboard computing device of the first vehicle to determine the status of the first vehicle comprising at least one of a position, speed, acceleration, turn angle, throttle, or brake.

11. The system of claim 1, comprising:
the first roadside computing device to store preconfigured information comprising at least one of a road geometry associated with the vehicular travel path, a speed limit, or a traffic sign.

12. The system of claim 1, comprising:
the first roadside computing device to transmit the information comprising preconfigured information stored in memory of the first roadside computing device and a current condition associated with the first location.

13. The system of claim 1, comprising the data processing system to:
receive, from a second roadside device, third data packets comprising a second status of the first vehicle; and
generate an updated label for the first vehicle based on the status and the second status.

14. The system of claim 1, comprising the data processing system to:
assign the label to the first vehicle responsive to receipt of the second one or more data packets comprising the status of the first vehicle, and the information associated with the first location in the vehicular travel path.

15. The system of claim 1, comprising the data processing system to:
transmit the vehicle command responsive to receipt of the second one or more data packets comprising the status of the first vehicle, and the information associated with the first location in the vehicular travel path.

16. The system of claim 1, comprising the data processing system to:
transmit the label assigned to the first vehicle to a third-party computing device.

17. A method of commanding vehicles via a vehicle-to-infrastructure communication network, comprising:
broadcasting, by a first roadside computing device positioned at a first location in a vehicular travel path, one or more data packets comprising a timestamp;
receiving, by a first vehicle comprising an onboard computing device, the one or more data packets broadcast by the first roadside computing device;
calibrating, by the onboard computing device of the first vehicle, an internal clock of the first vehicle to match a frequency of a clock of the first roadside computing device based on the timestamp received via the one or more data packets broadcast by the first roadside computing unit;
transmitting, by the onboard computing device of the first vehicle responsive to receipt of the one or more data packets and calibration of the internal clock, a status of the first vehicle to the first roadside computing device;
receiving, by the first roadside computing device, the status of the first vehicle;
generating, by the first roadside computing device, a second one or more data packets comprising the status of the first vehicle and information associated with the first location in the vehicular travel path;
transmitting, by the first roadside computing device, the second one or more data packets to a data processing system;
inputting, by the data processing system, the status of the first vehicle and the information associated with the first location into a deep learning engine;
assigning, by the data processing system based on an output from the deep learning engine, a label to the first vehicle;
selecting, by the data processing system, a vehicle command based on the label; and
transmitting, by the data processing system, the vehicle command to the first vehicle to cause the first vehicle to execute an action for traversing the vehicular travel path.

18. The method of claim 17, wherein the first roadside computing device comprises a traffic light controller, comprising:
determining, by the first roadside computing device, a current light status; and
providing, by the first roadside computing device, the current light status with the information associated with the first location in the vehicular travel path.

19. A system to command vehicles via a vehicle-to-infrastructure communication network, comprising:
a data processing system comprising one or more processors and memory, a command generator component and a deep learning engine, the data processing system to:
receive, from a roadside computing device positioned at a vehicular travel path, one or more data packets comprising a status for a vehicle, a time stamp, and information associated with a location of the vehicle in the vehicular travel path, wherein the vehicle transmits the status to the roadside computing device responsive to calibration of an internal clock of the vehicle to match a frequency of a clock of the roadside computing device;
input the status of the vehicle and the information associated with the location into the deep learning engine;
assign, based on an output from the deep learning engine, a label to the vehicle;

select a vehicle command based on the label; and
transmit the vehicle command to the first vehicle to execute an action for traversing the vehicular travel path.

20. The system of claim 19, comprising the data processing system to:
receive, from a second roadside device, second data packets comprising a second status of the vehicle; and
generate an updated label for the vehicle based on the status and the second status.

* * * * *